United States Patent [19]

Fukahori et al.

[11] Patent Number: 5,844,050
[45] Date of Patent: Dec. 1, 1998

[54] MODIFIED CONJUGATED DIENE POLYMER, PROCESS FOR PRODUCING SAME AND COMPOSITION COMPRISING SAME

[75] Inventors: Takahiko Fukahori; Kiyoshi Inamura, both of Yokohama, Japan

[73] Assignee: Nippon Zeon Co., Ltd., Tokyo, Japan

[21] Appl. No.: 586,813

[22] PCT Filed: Aug. 1, 1994

[86] PCT No.: PCT/JP94/01258

§ 371 Date: Jan. 29, 1996

§ 102(e) Date: Jan. 29, 1996

[87] PCT Pub. No.: WO95/04090

PCT Pub. Date: Feb. 9, 1995

[30] Foreign Application Priority Data

Jul. 30, 1993 [JP] Japan .................................... 5-208525
Sep. 30, 1993 [JP] Japan .................................... 5-269617

[51] Int. Cl.$^6$ ..................................................... C08F 8/32
[52] U.S. Cl. .................. 525/351; 525/332.8; 525/332.9; 525/333.1; 525/333.2; 525/352; 525/379
[58] Field of Search ..................................... 525/351, 352, 525/379

[56] References Cited

U.S. PATENT DOCUMENTS 4,461,883  7/1984  Takeuchi et al. .
4,647,625  3/1987  Aonuma et al. .
5,064,910  11/1991  Hattori et al. .

FOREIGN PATENT DOCUMENTS 2117778  10/1983  United Kingdom .

OTHER PUBLICATIONS

Derwent WPI, Week 8344; JP–A–58–162604, Abstract (Sep. 27, 1983).
Derwent WPI, Week 8515; JP–A–60–40109, Abstract (Mar. 2, 1985).
Derwent WPI, Week 9315; JP–A–50–59103, Abstract (Mar. 9, 1993).
Derwent WPI, Week 9314; JP–A–5–51406, Abstract (Mar. 2, 1993).

*Primary Examiner*—Bernard Lipman
*Attorney, Agent, or Firm*—Armstrong, Westerman, Hattori,McLeland & Naughton

[57] ABSTRACT

A modified polymer prepared by terminally modifying a conjugated diene polymer obtained by polymerization using a lanthanoid-containing catalyst in an organic solvent, with an N-substituted amino active compound, and having Mw of 100,000–1,000,000, a monomodal Mw-distribution, Mw/Mn of 1.3–5, and a terminal modification of at least 50%. The modified polymer is produced by (1) polymerizing a conjugated diene by using a catalyst which is either a mixture of (i) a reaction product of a lanthanoid-containing compound with an organoaluminum hydride and then with a Lewis base, and (ii) a halo-compound, or is a reaction product of (i) with (ii) prepared by reacting a portion of conjugated diene monomer prior to reaction of (ii); and then (2) terminally modifying the obtained living polymer with an N-substituted amino active compound.

9 Claims, 2 Drawing Sheets

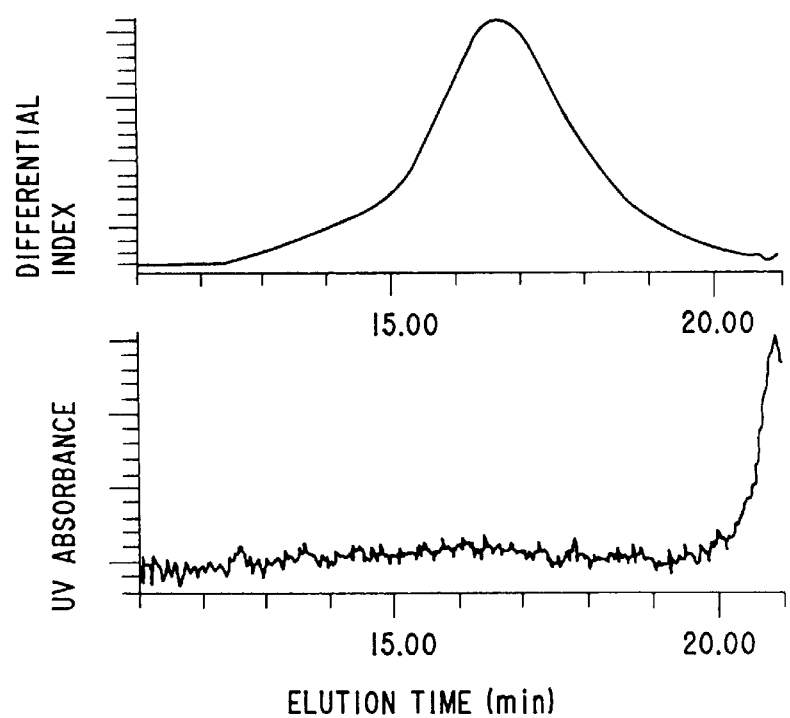
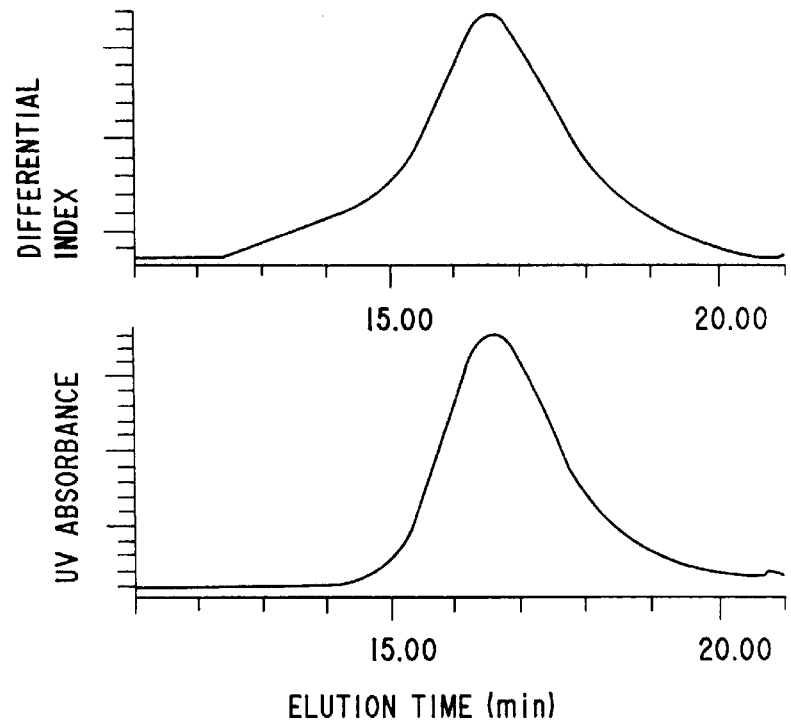

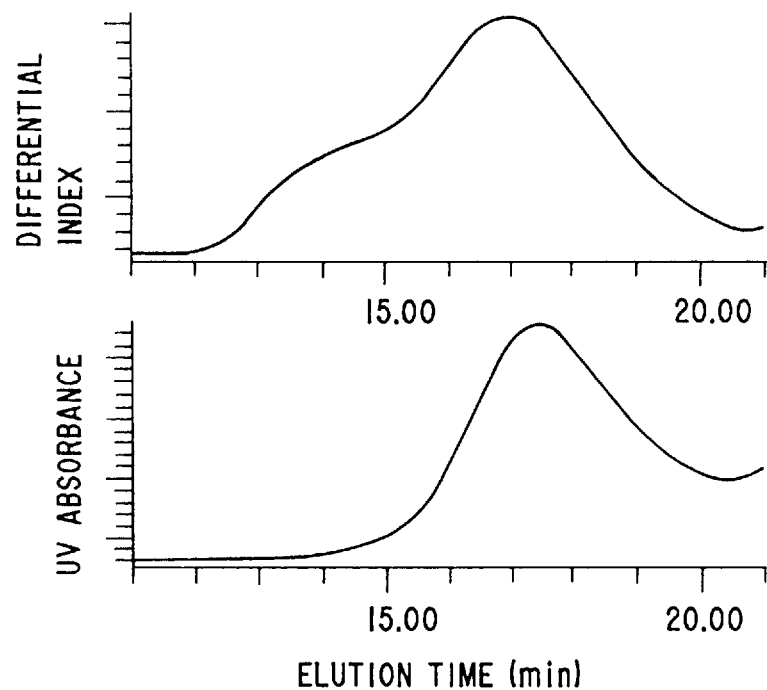
Fig. 3A
Fig. 3B
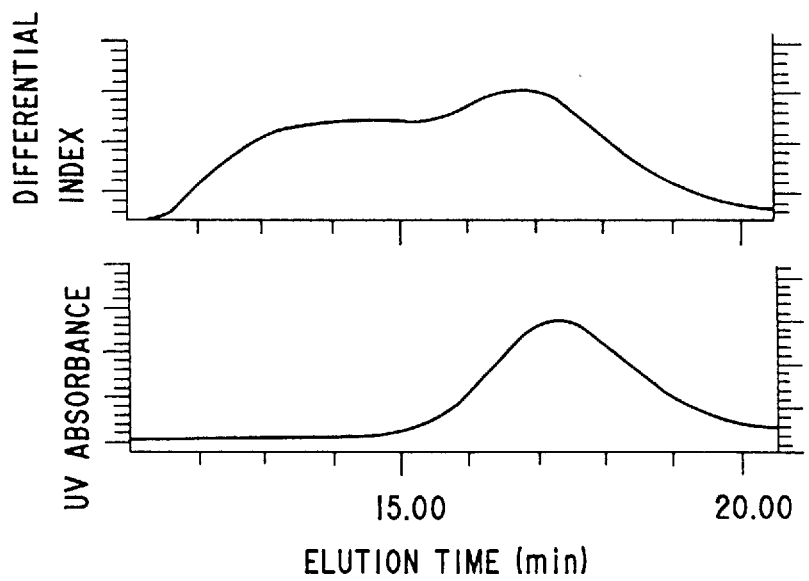
Fig. 4A
Fig. 4B

MODIFIED CONJUGATED DIENE POLYMER, PROCESS FOR PRODUCING SAME AND COMPOSITION COMPRISING SAME

TECHNICAL FIELD

This invention relates to a modified conjugated diene polymer obtained by highly modifying by a specific compound a conjugated diene polymer prepared by polymerization using a lanthanoid rare earth element-containing catalyst, a process for producing the modified conjugated diene polymer, and a rubber composition comprising the modified conjugated diene polymer.

BACKGROUND ART

High-cis polybutadiene produced by polymerization using a lanthanoid rare earth element-containing catalyst is generally a straight-chain polymer having only few branched chains, and has good abrasion resistance and fatigue resistance as compared with conventional high-cis polybutadiene produced by polymerization using a catalyst containing Co, Ni or Ti as the principal ingredient. However, in recent years, there is an increasing demand for vehicle tires having a higher abrasion resistance and a high rebound resilience for reducing the fuel consumption.

Catalysts containing a lanthanoid rare earth element-containing compound have been proposed which include, for example, a catalyst composition comprising (i) a reaction product of a carboxylic acid salt of a lanthanoid rare earth element such as neodymium with a Lewis base such as acetyl-acetone, (ii) an organoaluminum halide compound compound such as diethylaluminum chloride and (iii) an organoaluminum compound such as triethylaluminum (Japanese Examined Patent Publication H1-16244), a catalyst composition comprising the above three ingredients (i), (ii) and (iii) and further an organoaluminum hydride compound such as diisobutylaluminum hydride (Japanese Examined Patent Publication H1-55287). However, rubbers having satisfactory processability, tensile properties and rebound resilience cannot be obtained with these catalysts containing a lanthanoid rare earth element compound. Of these properties, an improvement of rebound resilience and tensile properties is eagerly desired.

It is known that an active group-terminated living copolymer prepared by polymerization using an alkali metal-containing catalyst such as an organolithium catalyst is coupled with a polyfunctional compound such as tin tetrachloride or silicon tetrachloride to improve the cold flow property and rebound resilience of the copolymer, and that the terminal group of the copolymer is modified with a specific polar compound to improve the rebound resilience and other cured properties. As examples of the polar compound used for the modification, there can be mentioned aromatic ketone compounds such as 4,4'-bis(dliethylamino) benzophenone (hereinafter abbreviated to "EAB") (Japanese Unexamined Patent Publication S58-162604), and linear and cyclic compounds having a—C(=M)—N<bond (wherein M is an oxygen atom or a sulfur atom) such as N,N,N',N'-tetramethyl-thiourea and N-methyl-ε-caprolactam (Japanese Unexamined Patent Publication S60-137913).

It also is known that a living polymer is prepared by polymerization using a catalyst comprising a lanthanoid rare earth element-containing compound, and the living polymer is modified at the terminal or is subjected to a coupling modification. However, where the coupling modification is effected by a polyfunctional compound, the modified polymer is not satisfactory in abrasion resistance. Only a few proposals have been made for the terminal modification of the living polymer. As examples of a modifier used for the terminal coupling modification, there can be mentioned tetrahalomethane (Japanese Unexamined Patent Publication S60-40109), an alkyltin halide or alkylgermanium halide compound (Japanese Unexamined Patent Publication S63-178102), carboxylic acid compounds (Japanese Unexamined Patent Publication H5-59103), and ester compounds (Japanese Unexamined Patent Publication H5-59406). As examples of the terminal modifier used for the terminal modification, there are known only a few terminal modifiers, which include active halide compounds such as 2,4,6-trichloro-1,3,5-triazine and benzoyl chloride (Japanese Unexamined Patent Publication S63-305101), and other active compounds such as ketene, isocyanate, carbodiimide, ethylene imine, epoxy and thiirane (Japanese Unexamined Patent Publiciation S63-297403).

The terminal modifiers for the living polymer prepared by polymerization using an alkali metal catalyst are described in Japanese unexamined Patent Publication S62-149798, ibid. S62-156104, ibid. S62-161844, ibid. S63-3041 and ibid. S62-22852, which are cited as prior art in Japanese Unexamined Patent Publication 4-142308, ibid. H4-154819, ibid. H5-51405 and ibid. H5-163310, but there are no working examples in these patent publications wherein these terminal modifiers are described specifically and in detail.

DISCLOSURE OF INVENTION

In view of the foregoing, the inventors made extensive researches for the modification of a living polymer prepared by polymerization using a neodymium metal-containing catalyst, with an aminobenzophenone compound such as EAB, and obtained the following findings (1), (2), (3) and (4), based on which the present invention has been completed, (1) Living polymers prepared by polymerization using conventional catalysts have a poor activity, and are reacted only to a slight extent with the specified modifier, and the degree of terminal termination is at most several tens % or less.

(2) Where a special catalyst prepared by reacting the catalyst ingredients in the specific order is used for polymerization, the resulting conjugated diene polymer can be modified at a high degree of terminal modification.

(3) The thus-terminal-modified conjugated diene polymer exhibits high rebound resilience and abrasion resistance.

(4) This terminal-modified conjugated diene polymer further exhibits highly improved mechanical strength, low temperature characteristics, and processability of extrusion.

In one aspect of the present invention, there is provided a modified conjugated diene polymer obtained by modifying a conjugated diene polymer prepared by polymerization using a lanthanoid rare earth element-containing compound as a catalyst in an organic solvent, with at least one modifying compound selected from N-substituted aminoketones, N-substituted aminothioketones, N-substituted aminoaldehydes, N-substituted aminothioaldehydes and compounds having a C(=M)—N<bond in the molecules wherein M is an oxygen atom or a sulfur atom; said modified conjugated diene polymer exhibiting a molecular weight distribution such that the molecular weight distribution curve is monomodal and the ratio of weight average molecular weight (Mw)/number average molecular weight (Mn) is in the range of 1.3 to 5; the weight average molecular weight (Mw) being in the range of 100,000 to 1,000,000, and the degree of terminal modification being at least 50%.

In another aspect of the present invention, there is provided a process for producing a modified conjugated diene polymer (hereinafter referred to as "first producing process") which exhibits a molecular weight distribution such that the molecular weight distribution curve is monomodal and the ratio of weight average molecular weight (Mw)/number average molecular weight (Mn) is in the range of 1.3 to 5, and which has a weight average molecular weight (Mw) of 100,000 to 1,000,000 and a degree of terminal modification of at least 50%; characterized by the steps of:

(1) polymerizing a conjugated diene monomer by using a catalyst comprising (i) a reaction product produced by a process wherein a lanthanoid rare earth element-containing compound is reacted with an organoaluminum hydride compound and then the thus-obtained product is reacted with a Lewis base, and (ii) a halogen-containing compound, to obtain a living conjugated diene polymer, and then (2) reacting the living conjugated diene polymer with at least one modifying compound selected from N-substituted aminoketones, N-substituted aminothioketones, N-substituted aminoaldehydes, N-substituted aminothioaldehydes and compounds having a C(=M)-N<bond in the molecules wherein M is an oxygen atom or a sulfur atom.

In still another aspect of the present invention, there is provided a process for producing a modified conjugated diene polymer (hereinafter referred to as "second producing process") which exhibits a molecular weight distribution such that the molecular weight distribution curve is monomodal and the ratio of weight average molecular weight (Mw)/number average molecular-weight (Mn) is in the range of 1.3 to 5, and which has a weight average molecular weight (Mw) of 100,000 to 1,000, and a degree of terminal modification of at least 50%; characterized by the steps of:

(1) polymerizing a conjugated diene monomer by using a catalyst prepared by a process wherein a lanthanoid rare earth element-containing compound, an organoaluminum hydride compound, a Lewis base and a halogen-containing compound are reacted in this consecutive order, provided that a portion of the conjugated diene monomer is reacted in any of the reaction stages prior to the reaction of the halogen-containing compound, to obtain a living conjugated diene polymer, and then (2) reacting the living conjugated diene polymer with at least one modifying compound selected from N-substituted aminoketones, N-substituted aminothioketones, N-substituted aminoaldehydes, N-substituted aminothioaldehydes and compounds having a C(=M)—N< bond in the molecules wherein M is an oxygen atom or a sulfur atom.

In a further aspect of the present invention, there is provided a rubber composition comprising at least 20% by weight of the above-specified modified conjugated diene polymer.

BRIEF DESCRIPTION OF DRAWINGS

FIGS. 1A and 1B illustrate, GPC charts of a polymer prior to the terminal modification used in the examples wherein the upper chart shows a molecular weight distribution as obtained by a differential refractometer and the lower chart shows a molecular weight distribution as obtained by a UV detector. Similarly, the upper chart and the lower chart in each of FIGS. 2 to 4 are a molecular weight distribution obtained by a differential refractometer and-that obtained by a UV detector, respectively.

FIGS. 2A and 2B illustrate, GPC charts showing the molecular weight distribution of the terminal group-modified polymer described in Example 1.

FIGS. 3A and 3B illustrate, is GPC charts showing the molecular weight distribution of the terminal group-modified polymer described in Comparative Example 1.

FIGS. 4A and 4B illustrate. GPC charts showing the molecular weight distribution of the terminal group-modified polymer described in Comparative Example 8.

BEST MODE FOR CARRYING OUT THE INVENTION

The modified conjugated diene polymer of the present invention is characterized as having been modified with at least one compound selected from an N-substituted aminoketone, an N-substituted aminathioketone, an N-substituted aminoaldehydet an N-substituted aminothioaldehyde and a compound having a C(=M)—N< bond (wherein M is an oxygen atom or a sulfur atom) in the molecule at a high degree of terminal modification of at least 50%.

To attain the high degree of terminal modification with the above-specified compound, it is essential to prepare a conjugated diene polymer having a high living activity. This polymer having a high living activity can be prepared by using a new catalyst according to the present invention.

The ingredients constituting the catalyst used in the present invention will be described.

The lanthanoid rare earth element used in the present invention is not particularly limited, and there can be mentioned elements of atomic number 57 to 71, which include, for example, cerium, lanthanum, praseodymium, neodymium and gadolinium. Of these, neodymium is advantageously used because it is readily available. These elements may be used either alone or in combination.

As examples of the lanthanoid rare earth element-containing compound, there can be mentioned its salts with an organic acid and an inorganic acid. Of these, organic acid salts are preferable, and carboxylic acid salts are especially preferable. The carboxylic acid salts of a lanthanoid rare earth element are, for example, those which are represented by the formula: $Ln(R^1CO_2)_3$ wherein Ln is a lanthanoid rare earth element and $R^1$ is a hydrocarbon residue having 1 to 20 carbon atoms which is usually selected from saturated and unsaturated lineart branched and cyclic alkyl groups. As specific examples of the carboxylic acids used, there can be mentioned acetic acid, propionic acid, n-butyric acid, iso b-butyric acid, valeric acid, pivalic acid, hexanoic acid, heptanoic acid, octanoic acid, octenoic acid, oleic acid, stearic acid, benzoic acid, naphthenic acid, phenylacetic acid and tricyclohexylacetic acid. Of these, carboxylic acids having at least 5 carbon atoms are preferable.

A free carboxylic acid can be used in combination with the lanthanoid rare earth element-containing compound. The amount of the carboxylic acid is not particularly limited, but is usually in the range of 0.001 to 3 moles, preferably 0.005 to 2 moles and more preferably 0.01 to 1 .5 moles, per mole of the lanthanoid rare earth element. If the amount of the free carboxylic acid is too small, some lanthanoid rare earth element-containing compounds are not completely soluble in an organic solvent, and thus the polymerization activity is reduced.

The organoaluminum hydride compound includes, for example, those which are represented by the formula: $AlH_nR^2{}_{3-n}$ wherein $R^2$s independently represent an alkyl group, a cycloalkyl group, an aryl group or an aralkyl group and preferably have 1 to 8 carbon atoms, and n is an integer of 1 to 3. As specific examples of the hydrogenated organoaluminum compound, there can be mentioned diethylaluminum hydride, dipropylaluminum hydride, diisobutylaluminum hydride, ethylaluminum dihydride and isobutylaluminum dihydride. Of these, monohydrides such as diethylaluminum hydride and diisobutylaluminum hydride are preferable. These organoaluminum hydride compounds may be used either alone or in combination.

As specific examples of the Lewis base, there can be mentioned nitrogen-containing compounds such as pyridine, triethylamine and N,N'-dimethylformamide, ether compounds such as tetrahydrofuran and diphenyl ether, organophosphorus compounds such as triphenylphosphine, tributylphosphine, tri-n-octylphosphine, triethylphosphine, tri-n-propyl-phosphine, tri-isopropylphosphine and 1,2-diphenylphosphine, alcohol compounds such as methyl alcohol, ethyl alcohol, n-,iso- and tert.-butyl alcohols, n-hexyl alcohol, n-octyl alcohol, 1,5-pentanediol and 1,6-hexanediol, ketone compounds such as acetylacetone; and thioether compounds such as thiophene, thioalcohol compounds and thioketone compounds, i.e., compounds which correspond to the above-listed ether compounds, alcohol compounds and ketone compounds and have a sulfur atom instead of an oxygen atom. Of these Lewis base compounds, organophosphoric compounds are preferable.

As the halogen-containing compounds, there can be mentioned halogen-containing Lewis acids and organic halogen-containing compounds capable of readily liberating a halogen. The halogen-containing Lewis acids include compounds represented by the formula: $AlX_m R^3_{3-m}$ and compounds corresponding thereto which have Si, Sn or other element instead of Al. In this formula, X is chlorine, bromine, fluorine or iodine, $R^3$s are a hydrocarbon residue having 1 to 8 carbon atoms, such as an alkyl group, a cyclo-alkyl group, an aryl group and an aralkyl group, and $R^3$s may be the same or different, and m is a number of 1, 1.5 or 2. As specific examples of the halogen-containing Lewis acid, there can be mentioned dimethylaluminum chloride, diethyl-aluminum chloride, dibutylaluminum chloride, ethylaluminum sesquichloride, ethylaluminum dichloride, iso-butylaluminum chloride, iso-butylaluminum sesquichloride and aluminum trichloride, and bromine-containing Lewis acids, fluorine-containing Lewis acids and iodine-containing Lewis acids, which correspond to the above-listed halogen-containing Lewis acids. These halogen-containing Lewis acids may be used either alone or in combination. As examples of the organic halogen-containing compound capable of readily liberating a halogen, there can be mentioned organic acid halides and tertiary alkyl halides.

In the present invention, a catalyst is prepared from the above-mentioned ingredients. To prepare a highly living conjugated diene polymer intended by the present invention, it is important that the above ingredients are reacted in the specific order. Namely, in the first producing process, first, the lanthanoid rare earth element-containing compound is reacted with the organoaluminum hydride compound; then, the thus-obtained reaction product is reacted with the Lewis base to prepare a first ingredient of the catalyst; and the first ingredient and the halogen-containing compound, i.e., second ingredient of the catalyst, are separately incorporated in a charge of a conjugated diene monomer for polymerization.

If the above-mentioned order of reaction is varied, the intended highly living conjugated diene polymer cannot be obtained. For example, in the case where first the lanthanoid rare earth element-containing compound is reacted with the Lewis base, then the thus-obtained reaction product is reacted with the organoaluminum hydride compound to prepare a first ingredient of the catalyst, the highly living conjugated diene polymer cannot be obtained with this first ingredient and the second ingredient.

In the second producing process, first the lanthanoid rare earth element-containing compound is reacted with the organoaluminum hydride compound, the thus-obtained product is reacted with the Lewis base, and finally the thus-obtained product is reacted with the halogen-containing compound, but, a portion of the conjugated diene monomer is reacted in any of the reaction stages prior to the reaction of the halogen-containing compound; and the thus-prepared product is incorporated in a charge of a conjugated diene monomer for polymerization.

The ratio of the lanthanoid rare earth element-containing compound to the organoaluminum hydride compound is 1:5 to 1:150 by mole, preferably 1:10 to 1:100 by mole.

The ratio of the lanthanoid rare earth element-containing compound to the Lewis base is 1:0.01 to 1:20 by mole, preferably 1:2 to 1:10 by mole.

The ratio of the lanthanoid rare earth element-containing compound to the second ingredient of the catalyst, i.e., the halogen-containing compound, is 1:0.1 to 1:10, preferably 1:1 to 1:5, expressed by the gram atom ratio of the lanthanoid rare earth element to the halogen atom.

The first and second producing processes of the present invention will be more specifically described.

In the first producing process, a lanthanoid rare earth element-containing compound is reacted with a organoaluminum hydride compound in the first stage for preparing the first ingredient of the catalyst. Usually, the respective catalyst ingredients are dissolved in an appropriate aliphatic, alicyclic or aromatic solvent such as, for example, benzene, toluene, pentane, heptane, n-hexane or cyclohexane under agitation. The reaction is conducted at a temperature of −30° to 100° C., preferably 0° to 80° C. After the reaction, the reaction mixture is preferably aged.

In the second stage for reacting the reaction product obtained in the first stage with a Lewis base, usually the reaction product is not separated from the reaction mixture prepared in the first stage, and the Lewis base is added in the reaction mixture. After the Lewis base is added in and thoroughly stirred with the reaction mixture, the reaction is conducted at a temperature of −30° to 100° C., preferably 0° to 80° C. After completion of the reaction, the reaction mixture is preferably aged to enhance the activity for polymerization. The thus-prepared first ingredient of the catalyst is usually used as an as-obtained reaction mixture without separation of the ingredient.

In the second producing process, first a lanthanoid rare earth element-containing compound is reacted with a organoaluminum hydride compound for the preparation of the catalyst. The lanthanoid rare earth element-containing compound is directly reacted with a organoaluminum hydride compound as they are, or the two compounds are reacted with each other as a solution in an appropriate solvent such as, for example, benzene, toluene, pentane, heptane, hexane or cyclohexane. Then a Lewis base and a halogen-containing compound are reacted in this order. A portion of the conjugated diene monomer is added in any stage prior to the reaction of the halogen-containing compound. The reaction temperature in the respective reaction stages is in the range of −30° to 100° C., preferably 0° to 80° C. The reaction time is in the range of several seconds to several tens hours, preferably several minutes to several hours. After the reaction, the reaction mixture is preferably aged to enhance the activity for polymerization.

In the catalyst-preparing step in the second producing process, the ratio of the lanthanoid rare earth element-containing compound to the portion of the conjugated diene monomer, used for preparing the catalyst, is 1:1 to 1:1,000 by mole, preferably 1:2 to 1:100 by mole.

It is important for the preparation of the catalyst that (1) in the first stage, the lanthanoid rare earth element-containing compound is reacted with the organoaluminum hydride compound; (2) the reaction product obtained in the first stage (1) is reacted with the Lewis base prior to the reaction with the halogen-containing compound; (3) in the first producing process, the reaction product obtained in the second stage (2), i.e., obtained by reacting the reaction product in the first stage (1) with the Lewis base, is incorporated together with the halogen-containing compound in a conjugated diene monomer charge for polymerization; or, in the second producing process, after a portion of the conjugated diene monomer is reacted in any catalyst preparing stage, the reaction product obtained in the second stage (2), i.e., obtained by reacting the reaction product in the first stage (1) with the Lewis base, is reacted with the halogen-containing compound, and the thus-prepared reaction product is incorporated in a conjugated diene monomer charge for polymerization.

As specific examples of the conjugated diene monomer, there can be mentioned 1,3-butadiene, isoprene, 1,3-pentadiene, 2,3-dimethyl-1,3-butadiene and myrcene of these, 1,3-butadiene is preferable. These conjugated diene monomers may be used either alone or in combination. If desired, a monomer copolymerizable with the conjugated diene monomer can be added. The copolymerizable monomer includes, for example, aromatic vinyl compounds such as styrene. The amount of the copolymerizable monomer is not particularly limited, but usually not larger than 40% by weight, preferably 10 to 30% by weight.

To produce a highly living conjugated diene polymer in the first producing process, a conjugated diene monomer is polymerized by using a catalyst comprising the above-specified first catalyst ingredient and the second catalyst ingredient such as a halogen-containing Lewis acid. In the first producing process, a procedure by which the two catalyst ingredients are incorporated in a monomer charge for polymerization is not particularly limited. Usually a procedure similar to that by which ingredients of a Ziegler catalyst are incorporated in a conjugated diene monomer charge for polymerization can be employed. Namely the first catalyst ingredient is incorporated in a mixture of the conjugated diene monomer and a solvent, and then the second ingredient is added thereto to initiate polymerization. Alternatively, a mixture of the first catalyst ingredient and the second catalyst ingredient is incorporated in a mixture of a conjugated diene monomer and a solvent to initiate polymerization. In the second producing process, the catalyst is incorporated in a mixture of a conjugated diene monomer and a solvent.

The amount of the catalyst used for a polymerization for a highly living polymer is usually in the range of 0.01 to 10 m-mole, preferably 0.05 to 5 m-mole, as the amount of the lanthanoid rare earth element-containing compound per 100 g of the conjugated diene monomer used.

The polymerization of a conjugated diene monomer is carried out in an organic solvent. The organic solvent used must be inert to the catalyst system used. As preferable examples of the organic solvent, there can be mentioned aromatic hydrocarbons such as benzene and toluene, aliphatic hydrocarbons such as pentane, n-hexaner iso-hexane and heptane, and alicyclic hydrocarbons such as cyclohexane.

The polymerization can be carried out in either continuous or batchwise manner. The polymerization temperature is usually in the range of −30° to 150° C., preferably 10° to 120° C. When the predetermined degree of polymerization is reached, a short-stopper such as water, an alcohol or a carboxylic acid is added to deactivate the catalyst and thereby to terminate polymerization. Where a short-stopper is not added, a living polymer having an active end group is produced.

To produce the terminal modified polymer of the present invention, after the completion of polymerization, a terminal modifier is added into the polymerization mixture containing a living polymer.

As specific examples of the terminal modifier, there can be mentioned N-substituted amino ketones such as 4-N,N-dimethylaminoacetophenone, 4-N,N-diethylaminoacetophenone, 1,3-bis(diphenylamino)-2-propanone, 1,7-bis(methylethyl-amino)-4-heptanone, 4-N, N-dimethylaminobenzophenone, 4-N N-di-tert.-butyl-aminobenzophenone, 4-N,N-diphehylamino-benzophenone, 4,4'-bis-(dimethylamino)benzophenone, 4,41'- bis-(diethylamino)benzophenone and 4,4'-bis(diphenylamino)-benzophenone, and corresponding N-substituted aminothio-ketones; N-substituted aminoaldehydes such as 4-N,N-dimethylaminobenzaldehyde, 4-N,N-diphenylaminobenzaldehyde and 4-N,N-divinylaminobenzaldehyde, and corresponding N-substituted aminothioaldehydes; and compounds having a C(=M)—N< bond (wherein M is an oxygen atom or a sulfur atom) in the molecules which include, for example, N-substituted lactams such as N-methyl-β-propiolactam, N-phenyl-β-propio-lactam, N-methyl-2-pyrrolidone, N-phenyl-2-pyrrolidone, N-tert.-butyl-2-pyrrolicone, N-phenyl-5-methl-2-pyrrolidone, N-methyl-2-piperidone, N-phenyl-2-piperidone, N-methyl-ε-caprolactam, N-phenyl-ε-caprolactam, N-methyl-ω-laurylo-lactam and N-vinyl-ω-laurylolactam, and corresponding N-substituted thiolactams, and N-substituted cyclic thioureas such as 1,3-dimethylethylene urea, 1,3-divinylethylene urea, 1,3-diethyl-2-imidazolidinone, 1-methyl-3-ethyl-2-imidazolidinone and 1,3-dimethl-2-imidazolidinone, and corresponding N-substituted cyclic thioureas.

The amount of the terminal modifier used is varied depending upon the particular degree of terminal modification, and is usually in the range of 0.1 to 100 moles, preferably 1.0 to 50 moles, per mole of the lanthanoid rare earth element-containing compound. The terminal modification reaction is carried out at a temperature of room temperature to 100° C. for a period of several seconds to several hours. A modified polymer having a highly terminal-modified is obtained by conducting the polymerization by using a catalyst for producing a highly living polymer, and successively modifying the terminal group.

In the polymerization of a conjugated diene monomer using the above-specified catalyst in the present invention, a highly living polymer is produced, and therefore, it is possible that other monomer capable of being polymerized by the catalyst used can be added to the polymerization mixture prior to the termination of polymerization to continue the polymerization whereby a block copolymer is produced. Further, it is possible that a coupling agent capable of reacting with the active terminals is added whereby a branched polymer having a broad molecular weight distribution is obtained.

To produce a branched polymer, a polyfunctional coupling agent is reacted with a living polymer. This reaction can be effected by adding the coupling agent into the polymerization mixture prior to or after the terminal modification. Preferably the coupling agent is added into the polymerization mixture after the completion of polymerization but before the terminal modification.

As the coupling agent, polyfunctional coupling agents can be used which have been conventionally used for coupling living polymers produced by polymerization using an alkali metal catalyst. Typical examples of the polyfunctional coupling agent are metal halides expressed by the formulae: $R_pMX_{4-p}$, $M'X_2$, $X_3M$—$R'$—$MX_3$ and $X_2RM$—$R'$—$MRX_2$ wherein M is Si, Ge, Sn or Pb, M' is Sn or Pb, X is chlorine, bromine or iodine, R is an alkyl group, an aryl group or an aryl group, R' is an alkylene group or a phenylene group, and p is an integer of 0 to 2. As specific examples of the polyfunctional coupling agents of the above formulae, there can be mentioned tin tetrachloride, tin dichloride, tin tetrabromide, silicon tetrachloride, silicon tetrabromide, silicon tetraiodide, silicon dichloride, germanium tetrachloride, lead dichloride, methyltrichlorosilane, dimethyldichlorosilane, butyltrichlorosilane, dibutyldichlorotin, bistrichlorosilylethane and bistrichlorostannylethane. As examples of the coupling agents other than those of the above formulae, there can be mentioned carboxylic acid esters such as dimethyl adipate, diethyl adipate and ethyl benzoate, polyfunctional divinyl compounds such as divinylbenzene, and dibromoethane.

The amount of the coupling agent used is varied depending upon the particular amount of the branched polymer produced in the product. For example, a metal halide coupling agent is used in an amount of 0.1 to 0.5 equivalent weight, preferably 0.2 to 0.3 equivalent weight, per mole of the lanthanoid rare earth element. The coupling reaction is carried out usually at a temperature of 0 to 150° C. for 0.5 minute to 20 hours.

If desired, after the coupling reaction and the terminal modification reaction, the terminal-modified polymer is separated and recovered from the reaction liquid by steam stripping or by the addition of a coagulant such as, for example, an alcohol.

The thus-produced modified conjugated diene polymer of the present invention has a microstructure such that the amount of cis-1,4 bond is at least 70%, preferably at least 80% and more preferably at least 90%. If the amount of cis-1,4 bond is too small, the polymer has poor abrasion resistance and fatigue resistance.

The polymer has a weight average molecular weight (Mw) of 100,000 to 1,to 1,000,000, preferably 200,000 to 700,000 and more preferably 300,000 to 500,000. If the molecular weight is too low, the tensile strength, abrasion resistance and rebound resilience are deteriorated. If the molecular weight is too high, the processability is deteriorated. The molecular weight distribution of the polymer is such that the ratio (Mw/Mn) of the weight average molecular weight (Mw) to the number average molecular weight (Mn) is in the range of 1.3 to 5, preferably 1.5 to 4 and more preferably 1.7 to 3.5; and the molecular weight distribution curve is monomodal. If the ratio (Mw/Mn) is too large, the rebound resilience and abrasion resistance are deteriorated. If the ratio (Mw/Mn) is too small, the processability is deteriorated. If the molecular weight distribution curve is bimodal or more, the degree of terminal modification of the polymer tends to be reduced.

The degree of terminal modification of the terminal-modified polymer(Nd-Br) of the present invention means the ratio of the mole number of the modifying group which has been introduced to the terminal of the polymer, to the mole number of the polymer. The degree of terminal modification is calculated, for example, by the following formula:

Degree of terminal modification =$[A(UV)_{Nd-Br}/A(RI)_{Nd-Br}] \times [A(RI)_{Li-Br}/A(UV)_{Li-Br}]$ wherein $A(UV)_{Nd-Br}$ and $A(RI)_{Nd-Br}$ are the area of the UV peak and the area of the RI peak, respectively, which are measured by GPC of the terminal modified polymer (Nd-Br), and $A(UV)_{Li-Br}$ and $A(RI)_{Li-Br}$ are the area of the UV peak and the area of the peak, respectively, which are measured by GPC of a polymer (Li-Br) which has the same absolute molecular weight (number average molecular weight) as that of the Nd-Br, and the entirety of the terminal groups of which have been modified by the same terminal modifier.

As the entire terminals-modified polymer Li-Br, at least three polymers Li-Br (monomodal) having different molecular weights are prepared and the entire terminals of the polymers are modified by using the same terminal modifier as that used for terminal modification of the polymer Nd-Br. The absolute molecular weight (number average molecular weight Mn) of the terminal-modified polymer Li-Br, and the ratio of the UV peak area/the RI peak area, as measured by GPC, are determined. A constant γ is calculated from the Mn and the ratio of the UV peak area/the RI peak area according to the following following equation. Thus, it can be confirmed that the value of γ does not vary depending upon the molecular weight of the polymer Li-Br.

1 (Degree of terminal modification)
=$[(\alpha A(UV)/\beta(A(RI)/Mn)]$
=$\gamma[A(UV)/A(RI)] \times Mn$
∴γ=$[A(RI)/(A(UV) \times Mn)]$ The modified conjugated diene polymer of the present invention can be used either alone or in combination with the other rubber. Where it is used in combination with the other rubber, the conjugated diene polymer of the present invention, modified with the specific modifier, should be used in an amount of at least 20% by weight, preferably 30 to 90% by weight and more preferably 40 to 80% by weight, based on the weight of the total rubber ingredients. If the amount of the terminal modified polymer of the present invention is too small, the enhancement of rebound resilience, abrasion resistance and tensile strength, intended by the present invention, cannot be attained.

As examples of the rubber which can be used in combination with the terminal-modified conjugated diene polymer of the present invention, there can be mentioned natural rubber, a synthetic polyisoprene rubber, an emulsion-polymerized styrenebutadiene copolymer rubber, a solution-polymerized styrene-butadiene copolymer rubber, a low-cis-1,4-polybutadiene rubber, a high-cis-1,4-polybutadiene rubber, an ethylene-propylene-diene copolymer rubber, an acrylonitrile-butadiene copolymer rubber, a chloroprene rubber and a halogenated butyl rubber. Where the rubber combination is used for tires, natural rubber, synthetic polyisoprene rubber and a styrene-butadiene copolymer rubber are preferable. As specific examples of preferable rubber compositions, there can be mentioned a composition comprising a terminal-modified polybutadiene rubber of the present invention and natural rubber or synthetic isoprene rubber at a weight ratio of 20/80 to 80/20, more preferably 40/60 to 60/40, and a composition comprising a terminal-modified polybutadiene rubber of the present invention, natural rubber or synthetic isoprene rubber, and a styrene-butadiene copolymer rubber at a weight ratio of (80–20)/(10–70)/(10–70).

Further, a modified polymer rubber obtained by modifying an active living polymer with a polyfunctional compound, and modified polymers and copolymers, other than that of the present invention, can also be used in combination with the modified rubber of the present invention.

If the modified conjugated diene polymer of the present invention is used in combination with a conjugated diene polymer prepared by polymerization of the same monomer or monomers used for the preparation of the modified conjugated diene polymer of the present invention, the modified conjugated diene polymer of the present invention should occupy at least 40%, preferably at least 50% and more preferably at least 60% of the entire conjugated diene polymers prepared from the same monomer or monomers. If the amount of the modified conjugated diene polymer of the present invention is smaller than 40%, the intended improvement of physical properties cannot be attained. For example, if the modified conjugated diene polymer of the present invention is a modified polybutadiene rubber and this modified polybutadiene rubber is used in combination with a polybutadiene rubber such as a low-cis-1,4-polybutadiene rubber or a high-cis-1,4-polybutadiene rubber, the modified polybutadiene rubber should occupy at least 40% of the total polybutadiene rubbers.

As the conjugated diene polymer to be blended with the modified conjugated diene polymer of the present invention, a branched chain conjugated diene polymer can be used, which is prepared by a process wherein a conjugated diene monomer is polymerized by using a catalyst composed of a lanthanoid rare earth element-containing compound, such as neodymium-containing compound, in a manner similar to that in the present invention, and further, the thus-obtained polymer is coupled with a polyfunctional coupling agent. The branched chain conjugated diene polymer and the modified conjugated diene polymer can be separately prepared, and blended together to afford the rubber composition. Alternatively, a terminal modifier and a polyfunctional coupling agent can be either simultaneously or successively added to the living conjugated diene polymer whereby a composition composed of a terminal-modified polymer and a branched chain polymer is prepared. A preferable method comprises adding first a polyfunctional coupling agent to the living conjugated diene polymer and then adding a terminal modifier thereto. In this method, the degree of terminal modification is preferably such that the resulting composition comprises at least 25% by weight of the terminal-modified conjugated diene polymer of the present invention, and more preferably, the resulting composition comprises at least 30% by weight of the terminal-modified conjugated diene polymer and not larger than 30% by weight of an unmodified conjugated-diene polymer.

If desired, in the conjugated diene polymer composition of the present invention, conventional additives can be incorporated. As such additives, there can be mentioned reinforcers such as carbon black and silica, fillers such as calcium carbonate, oil extenders such as aromatic, naphthenic and paraffinic oil extenders, vulcanizing agents such as sulfur, a sulfur donor and a peroxide, vulcanizing aids such as stearic acid and zinc oxide, vulcanization accelerators such as sulphenamider thiuram and guanidine vulcanization accelerators, aging stabilizers such as amine and phenolic aging stabilizers antiozonants, processing aids, and tackifiers.

The invention will now be described in more detail by the following examples that by no means limit the scope of the invention.

EXAMPLE 1

A catalyst of the present invention was prepared from neodymium octenate (Nd-oct), dibutylaluminum hydride (DiBAH) tributylphosphine (TBP) and diethylaluminum chloride (DEAC) as follows.

A 100 ml-volume pressure glass ampule was capped and flashed with nitrogen. The ampule was charged with a solution of DiBAH in hexane (DiBAH: 0.93 mole/l, 40 ml), and then, 1.48 ml of a solution of Nd-oct in-hexane (Nd-oct: 0.73 mole/l, content of free octenic acid: 12% by weight) was gradually dropwise added. The DiBAH and Nd-oct were thoroughly reacted to obtain a uniform solution, and then 5.4 m-mole of TBP was added and the mixture was reacted for several minutes. The thus-obtained reaction mixture was used as it is as a first catalyst ingredient.

A 100 ml-volume pressure glass ampule.was capped and flashed with nitrogen. The ampule was charged with 53 g of a solution of 6.6 g of deaerated 1,3-butadiene in cyclohexane. Then the first catalyst ingredient (Nd: 0.0066 m-mole) was added, and the mixture was thoroughly stirred. The DEAC (0.0165 m-mole) was added as a second catalyst ingredient. The ingredients in the ampule were maintained at 60° C. for 30 minutes while the ampule was shaken, to conduct polymerization whereby polybutadiene was obtained.

After completion of the polymerization, 4,4'-bis-(diethylamino)benzophenone (EAB: 0.264 m-mole) was added as a terminal modifier, and the content was maintained at 60° C. for 70 minutes to effect a reaction for terminal modification.

The polymerization procedure and conditions, properties of the polymer, and the degree of modification are shown in Table 1.

GPC charts of the polybutadiene prior to the terminal modification are shown in FIG. 1, which were obtained by a differential refractometer and a UV detector (wave length: 310 nm), connected in series. Similarly obtained GPC charts of the terminal modified polybutadiene are shown in FIG. 2. As seen from the figures, the molecular weight distribution curve are monomodal and the substantial part of the polybutadiene was modified.

COMPARATIVE EXAMPLES 1–4

The dependence of the degree of terminal modification by EAB upon the procedure for preparing the catalyst was examined as follows. The procedures described in Example 1 were repeated to prepare catalysts, conduct polymerization and conduct terminal modification, wherein the procedure for preparing the catalyst was varied. Namely, the order of addition of the respective ingredients "Nd-oct→DiBAH→TBP" for the preparation of the first catalyst ingredient in Example 1 was changed to "Nd-oct→TBP→DiBAH" in Comparative Example 1; Nd-oct, DiBAH and TBP were added at once in Comparative Example 2; DEAC used as the second catalyst ingredient in Example 1 was exchanged with TBP in Comparative Example 3; and TBP was not used in the preparation of the first catalyst ingredient in Comparative Example 4. The results are shown in Table 1.

GPC charts of the polymer obtained in Comparative Example 1 are shown in FIG. 3. As seen from this figure, the molecular weight distribution curve is bimodal, and the peak of higher molecular weight side was modified only to a minor extent.

EXAMPLE 2

A 100 ml-volume pressure glass ampule was capped and flashed with nitrogen. The ampule was charged with a solution of DiBAH in hexane (DiBAH: 0.93 mole/l, 40 ml), and then, 1.48 ml of a solution of Nd-oct in hexane (Nd-oct: 0.73 mole/l, content of free octenic acid: 12% by weight) was gradually dropwise added. The DiBAH and Nd-oct tive Example 6; 1,3-butadiene was added in the last stage in Comparative Example 7; and TBP was not added and the other three ingredients were added at once in Comparative Example 8. The results are shown in Table 1.

GPC charts of the polymer obtained in Comparative Example 8 are shown in FIG. 4. As seen from this figure, the molecular weight distribution curve is clearly bimodal, and the substantial part of the entire molecular weight portions was modified only to a minor extent.

TABLE 1

|  | Order of addition of catalyst ingredients | Procedure of addition of catalyst ingredients | Conversion (%) | Molecular weight Mw × 10$^{-4}$ | Molecular weight distribution Mw/Mn | Modality of molecular weight distribution | Micro-structure cis-1,4(%) | Degree of terminal modification (%) |
|---|---|---|---|---|---|---|---|---|
| Example 1 | [(A + B) + D], C | Two parts | 42 | 15.6 | 2.4 | Mono | 97.0 | 74.8 |
| Com. Ex. 1 | [(A + D) + B], C | Two parts | 42 | 19.2 | 3.0 | Bi | 96.7 | 35.0 |
| Com. Ex. 2 | [(A + B) + C], D | Two parts | 43 | 18.0 | 2.8 | Bi | 96.9 | 35.1 |
| Com. Ex. 3 | [A + B + D], C | Two parts | 39 | 20.8 | 3.1 | Bi | 96.5 | 33.2 |
| Com. Ex. 4 | [A + B], C | Two parts | 17 | 12.2 | 3.2 | Bi | 97.0 | 31.4 |
| Example 2 | [(A + B) + D + E + C] | One part | 45 | 15.9 | 2.3 | Mono | 97.1 | 73.3 |
| Com. Ex. 5 | [A + B + D + C] | One part | 32 | 15.4 | 2.9 | Bi | 96.8 | 34.7 |
| Com. Ex. 6 | [A + B + E + C] | One part | 25 | 18.3 | 3.1 | Bi | 96.9 | 27.7 |
| Com. Ex. 7 | [A + D + B + C + E] | One part | 38 | 19.5 | 3.2 | Bi | 96.5 | 33.2 |
| Com. Ex. 8 | [A + B + C] | One part | 20 | 15.9 | 3.0 | Bi | 97.1 | 25.2 |

Note: "Order of addition of catalyst ingredients",
A: Nd-oct, B: DiBAH, C: DEAC, D: TBP, E: BD
"Procedure of addition of catalyst ingredients",
Two parts: first catalyst ingredient and second catalyst ingredient were added.
One part: single catalyst ingredient comprising the entire ingredients was added.
"Molecular weight" is the absolute molecular weight which was determined by a high speed liquid chromatograph ("Column GMH-XL" supplied by Tosoh Corp.) and a multi-angle laser light-scattering photometer (supplied by Wyatt Technology Co.), connected to the chromatograph.
"Molecular weight distribution" was expressed by the ratio of the weight average molecular weight/numver average molecular weight (Mw/Mn), based on the absolute molecular weight.
"Modality of the molecular weight distribution" was evaluated by observing the RI charts obtained by the chromatograph, with the naked eye.
"Mono": monomodal, the molecular weight distribution curve has a single peak.
"Bi": bimodal, the molecular weight distribution curve has two peaks which may not be completely separated.
"Micro-structure" was determined by measurement by an infrared spectrophotometer and calculation according to the Molero's method.
"Degree of terminal modification" was determined by the method hereinbefore described.

were thoroughly reacted to obtain a uniform solution and then 5.4 m-mole of TBP was added and the mixture was reacted for several minutes. To the thus-obtained reaction mixture, 1,3-butadiene (0.462 m-mole) was added and further DEAC (2.7 m-moles) was dropwise added to prepare a catalyst.

A 100 ml-volume pressure glass ampule was capped and flashed with nitrogen. The ampule was charged with 53 g of a solution of 6.6 g of deaerated 1,3-butadiene in cyclohexane. Then the above-mentioned catalyst (Nd: 0.0066 m-mole) was added, and the mixture was maintained at 60° C. for 30 minutes while the ampule was shaken, to conduct polymerization.

After completion of the polymerization, EAB (0.264 m-mole) was added as a terminal modifier, and the content was maintained at 60° C. for 70 minutes to effect a reaction for terminal modification. The results of the polymerization and terminal modification are shown in Table 1.

COMPARATIVE EXAMPLES 5–8

The procedures described in Example 2 were repeated to prepare catalysts, conduct polymerization and conduct terminal modification, wherein the procedure for preparing the catalyst was varied. Namely 1,3-butadiene was not added in Comparative Example 5; TBP was not added in Compara-

EXAMPLES 3–5

By the same procedures as described in Example 1, polymerization and terminal modification were carried out wherein methyl-2-pyrrolidone (NMP), N-vinyl-2-pyrrolidone (NVP) and N-phenyl-2-pyrrolidone (NPP) were separately used instead of EAB as the terminal modifier with all other conditions remaining the same. The degree of terminal modification is shown in Table 2.

TABLE 2

|  | Terminal modifier | Degree of terminal modification |
|---|---|---|
| Example 3 | NMP | 71.3 |
| Example 4 | NVP | 70.2 |
| Example 5 | NPP | 72.5 |

EXAMPLE 6

An autoclave equipped with a stirrer was charged with 8,400 g of cyclohexane and 1,200 g of 1,3-butadiene, and further 0.923 m-mole of the same first catalyst ingredient as prepared in Example 1. The content was stirred for 10 minutes, and then, 2.31 m-moles of DEAC was added as the second catalyst ingredient and the temperature was elevated to 60° C. After it was confirmed that the conversion reached at least 90%, 24.0 m-moles of EAB was added and the mixture was maintained at 60° C. for one hour to effect a reaction.

The reaction mixture in the autoclave was introduced into a methanol containing 2% of 2,6-di-tert.-butyl-4-methylphehol whereby the produced polymer was coagulated, and an excess terminal modifier was removed. The coagulated polymer was dried to prepare a terminal-modified polymer (polymer A) for evaluation of the physical properties. polymer A had a weight average molecular weight (Mw) of 39.9 ×10$^4$. The Mw/Mn ratio was 2.5 and the molecular weight distribution curve was monomodal. The degree of terminal modification was 72%.

COMPARATIVE EXAMPLE 9

An autoclave equipped with a stirrer was charged with 8,400 g of cyclohexane and 1,200 g of 1,3-butadiene, and further 0.923 m-mole of the same first catalyst ingredient as prepared in Comparative Example 1. The succeeding procedure for polymerization was conducted in the same manner as described in Example 6. After it was confirmed that the conversion reached at least 90%, the terminal modification of polymer was conducted by the same procedure as described in Example 6 to prepare a terminal-modified polymer (polymer B) for evaluation of the physical properties. Polymer B had a weight average molecular weight (Mw) of 48.3×10$^4$. The Mw/Mn ratio was 3.2 and the molecular weight distribution curve was bimodal. The degree of terminal modification was 29%.

COMPARATIVE EXAMPLE 10

Polymerization was carried out by the same procedure as that described in Example 6, but, a terminal modifier was not added to the polymerization mixture and the catalyst was degraded by adding methanol. The polymerization mixture was coagulated and dried to prepare a polymer (polymer C) for evaluation of the physical properties. Polymer C had a weight average molecular weight (Mw) of 40.0×10$^4$ The Mw/Mn ratio was 2.5 and the molecular weight distribution curve was monomodal.

Using polymers prepared in Example 6 and Comparative Examples 9 and 10, and high-cis polybutadiene (trade name "Nipol" BR-1220 supplied by Nippon Zeon Co.) as the rubber ingredient, rubber compositions were prepared according to the recipe (recipe-1) shown in Table 3. Each rubber composition was press-vulcanized at 160° C. for 20 minutes to prepare a specimen for evaluation of the properties. The evaluation results are shown in Table 4.

The physical properties and processability were evaluated by the following methods.

(i) 300% Modulus

Tensile stress at a 300% elongation was measured according to JIS K-6301.

(ii) Rebound resilience

Rebound resilience was measured at 60° C. by using a Lüpke rebound resilience tester according to JIS K-6301.

(iii) Abrasion resistance

Abrasion resistance was measured by using a Pico abrasion tester according to ASTM D-2228.

(iv) Fatigue resistance

A specimen was punched from a vulcanized sheet having a thickness of 2 mm by a JIS #3 dummbbel die. Fatigue resistance was measured at room temperature, elongation of 75% and a revolution of 450 r.p.m by a constant-elongation fatigue resistance tester. The test was conducted on six specimens and the result was expressed by the average value.

(v) Hardness

Hardness was measured at −10° C. according to JIS K-6301.

(vi) Extrusion length

Using a Garvey-die extrusion tester, a length of a compound extruded per unit time was measured.

The evaluation results of the above-mentioned properties were expressed as index numbers as the values of the comparative sample i.e., high-cis polybutadiene ("Nipol" BR-1220), being 100. The larger the index numbers, the more preferred the evaluated properties (except for hardness). The smaller the hardness index number, the lower the hardness at the low temperature.

TABLE 3

| Recipe 1 | (parts) | Recipe 2 | (parts) |
|---|---|---|---|
| Rubber | 100 | Rubber | 100 |
| N-339 *1 | 50 | N-339 *1 | 50 |
| Aromatic oil | 5 | Aromatic oil | 5 |
| ZnO #1 | 3 | ZnO #1 | 3 |
| Stearic acid | 2 | Stearic acid | 2 |
| Aging stabilizer *2 | 1 | Aging stabilizer *2 | 1 |
| Vulcanization accelerator *3 | 1.5 | Vulcanization accelerator *3 | 1.5 |
| Sulfur #325 | 1.75 | Sulfur #325 | 1.5 |

*1 Seast KH supplied by Tokai Carbon K.K.
*2 Nocrac 6C supplied by Ouchi Shinko K.K.
*3 Nocceler Cz supplied by Ouchi Shinko K.K.

In Table 3, recipe-1 was employed where the rubber ingredient comprised BR, SBR, NR or IR, and recipe-2 was employed where the rubber ingreient comprised NBR, hydrogenated NBR (H-NBR) or EPDM.

TABLE 4

|  | Ex. 6 | Com. Ex. 9 | Com. Ex. 10 | Com. Ex. 11 | Ex. 7 | Com. Ex. 12 |
|---|---|---|---|---|---|---|
| Rubber |  |  |  |  |  |  |
| Polymer A (Modification 72%) | 100 | — | — | — | 70 | — |
| Polymer B (Modification 29%) | — | 100 | — | — | — | 70 |
| Polymer C (not modified) | — | — | 100 | — | — | — |
| High-cis polybutadiene | — | — | — | 100 | 30 | 30 |
| Properties (indexes) |  |  |  |  |  |  |
| 300% Modulus | 115 | 102 | 100 | 100 | 107 | 100 |
| Rebound resilience | 108 | 101 | 100 | 100 | 106 | 100 |
| Abrasion resistance | 140 | 106 | 103 | 100 | 122 | 101 |
| Hardness | 97 | 100 | 100 | 100 | 98 | 100 |
| Fatigue resistance | 140 | 107 | 104 | 100 | 121 | 105 |
| Extrusion length | 126 | 103 | 101 | 100 | 114 | 103 |

Using commercially available synthetic rubbers and synthetic rubbers made by ordinary processes, which are shown in Table 5, and polymer A prepared in Example 6 and polymer B prepared in Comparative Example 9, rubber compositions were prepared according to the recipes shown in Table 3. The rubber compositions prepared according to recipe-1 were press-vulcanized at 160° C. for 20 minutes, and those prepared according to recipe2 (containing NBR, H-NBR or EPDM) were press-vulcanized at 170° C. for 20 minutes. The properties of the thus-prepared specimens were evaluated. The results are shown in Tables 6 to 17, wherein "M" accompanying a polymer in the column of "blending ratio of polymers" means degree of terminal modification.

TABLE 5

| Rubber | Trade name/maker or micro-structure |
|---|---|
| E-SBR-1 | Nipol 1502/Nippon Zeon Co. |
| E-SBR-2 | Nipol 9550/Nippon Zeon Co. |
| NR | SMR-CV60 |
| High-cis IR | Nipol IR-2200/Nippon Zeon Co. |
| Low-cis IR | Low-cis IR, synthesized by a conventional method using an n-BuLi catalyst |
| S-SBR-1 | S-SBR (styrene: 10%, vinyl: 10%), synthesized by a conventional method |
| S-SBR-2 | S-SBR (styrene: 20%, vinyl: 60%, terminal-modified with EAB), synthesized by a conventional method |
| S-SBR-3 | S-SBR (styrene: 45%, vinyl: 50%), synthesized by a conventional method |
| NBR | Nipol 1042/Nippon Zeon Co. |
| H-NBR | Zetpol 2020/Nippon Zeon Co. |
| EPDM | KELTAN 512/Idemitsu DSM Co. |

TABLE 6

|  | Ex. 8 | Comp. Ex. 13 | Comp. Ex. 14 | Ex. 9 | Comp. Ex. 15 | Comp. Ex. 16 | Ex. 10 | Comp. Ex. 17 | Comp. Ex. 18 |
|---|---|---|---|---|---|---|---|---|---|
| Blending ratio of polymers | | | | | | | | | |
| Polymer A (M: 72%) | 25 | — | — | 50 | — | — | 75 | — | — |
| Polymer B (M: 29%) | — | 25 | — | — | 50 | — | — | 75 | — |
| BR1220 | — | — | 25 | — | — | 50 | — | — | 75 |
| E-SBR-1 | 75 | 75 | 75 | 50 | 50 | 50 | 25 | 25 | 25 |
| Properties (indexes) | | | | | | | | | |
| 300% Modulus | 103 | 100 | 100 | 106 | 101 | 100 | 110 | 101 | 100 |
| Rebound resilience | 102 | 100 | 100 | 106 | 100 | 100 | 112 | 100 | 100 |
| Abrasion resistance | 104 | 100 | 100 | 110 | 101 | 100 | 120 | 102 | 100 |
| Hardness | 99 | 100 | 100 | 98 | 100 | 100 | 97 | 100 | 100 |
| Fatigue resistance | 107 | 103 | 100 | 113 | 104 | 100 | 123 | 107 | 100 |
| Extrusion length | 104 | 100 | 100 | 110 | 103 | 100 | 121 | 104 | 100 |

TABLE 7

|  | Ex. 11 | Comp. Ex. 19 | Comp. Ex. 20 | Ex. 12 | Comp. Ex. 21 | Comp. Ex. 22 | Ex. 13 | Comp. Ex. 23 | Comp. Ex. 24 |
|---|---|---|---|---|---|---|---|---|---|
| Blending ratio of polymers | | | | | | | | | |
| Polymer A (M: 72%) | 25 | — | — | 50 | — | — | 75 | — | — |
| Polymer B (M: 29%) | — | 25 | — | — | 50 | — | — | 75 | — |
| BR1220 | — | — | 25 | — | — | 50 | — | — | 75 |
| E-SBR-2 | 75 | 75 | 75 | 50 | 50 | 50 | 25 | 25 | 25 |
| Properties (indexes) | | | | | | | | | |
| 300% Modulus | 102 | 100 | 100 | 105 | 100 | 100 | 109 | 101 | 100 |
| Rebound resilience | 103 | 100 | 100 | 104 | 100 | 100 | 107 | 101 | 100 |
| Abrasion resistance | 104 | 100 | 100 | 109 | 101 | 100 | 115 | 101 | 100 |
| Hardness | 99 | 100 | 100 | 99 | 100 | 100 | 98 | 100 | 100 |
| Fatigue resistance | 108 | 104 | 100 | 114 | 105 | 100 | 123 | 107 | 100 |
| Extrusion length | 104 | 100 | 100 | 109 | 101 | 100 | 116 | 103 | 100 |

TABLE 8

|  | Ex. 14 | Comp. Ex. 25 | Comp. Ex. 26 | Ex. 15 | Comp. Ex. 27 | Comp. EX. 28 | Ex. 16 | Comp. Ex. 29 | Comp. Ex. 30 |
|---|---|---|---|---|---|---|---|---|---|
| Blending ratio of polymers | | | | | | | | | |
| Polymer A (M: 72%) | 25 | — | — | 50 | — | — | 75 | — | — |
| Polymer (M: 29%) | — | 25 | — | — | 50 | — | — | 75 | — |
| BR1220 | — | — | 25 | — | — | 50 | — | — | 75 |
| NR | 75 | 75 | 75 | 50 | 50 | 50 | 25 | 25 | 25 |
| Properties (indexes) | | | | | | | | | |
| 300% Modulus | 103 | 100 | 100 | 107 | 100 | 100 | 112 | 101 | 100 |
| Rebound resilience | 102 | 100 | 100 | 105 | 100 | 100 | 108 | 100 | 100 |
| Abrasion resistance | 105 | 100 | 100 | 113 | 101 | 100 | 129 | 101 | 100 |
| Hardness | 99 | 100 | 100 | 99 | 100 | 100 | 97 | 99 | 100 |
| Fatigue resistance | 110 | 103 | 100 | 116 | 104 | 100 | 125 | 106 | 100 |
| Extrusion length | 108 | 100 | 100 | 113 | 102 | 100 | 120 | 105 | 100 |

TABLE 9

|  | Ex. 17 | Comp. Ex. 31 | Comp. Ex. 32 | Ex. 18 | Comp. Ex. 33 | Comp. Ex. 34 | Ex. 19 | Comp. Ex. 35 | Comp. Ex. 36 |
|---|---|---|---|---|---|---|---|---|---|
| Blending ratio of polymers | | | | | | | | | |
| Polymer A (M: 72%) | 25 | — | — | 50 | — | — | 75 | — | — |
| Polymer B (M: 29%) | — | 25 | — | — | 50 | — | — | 75 | — |
| BR1220 | — | — | 25 | — | — | 50 | — | — | 75 |
| High-cis IR | 75 | 75 | 75 | 50 | 50 | 50 | 25 | 25 | 25 |
| Properties (indexes) | | | | | | | | | |
| 300% Modulus | 102 | 100 | 100 | 105 | 100 | 100 | 108 | 100 | 100 |
| Rebound resilience | 102 | 100 | 100 | 105 | 100 | 100 | 107 | 101 | 100 |
| Abrasion resistance | 104 | 100 | 100 | 110 | 101 | 100 | 109 | 101 | 100 |
| Hardness | 99 | 100 | 100 | 98 | 100 | 100 | 97 | 100 | 100 |
| Fatigue resistance | 109 | 103 | 100 | 114 | 104 | 100 | 120 | 105 | 100 |
| Extrusion length | 107 | 100 | 100 | 110 | 102 | 100 | 115 | 104 | 100 |

TABLE 10

|  | Ex. 20 | Comp. Ex. 37 | Comp. Ex. 38 | Ex. 21 | Comp. Ex. 39 | Comp. Ex. 40 | Ex. 22 | Comp. Ex. 41 | Comp. Ex. 42 |
|---|---|---|---|---|---|---|---|---|---|
| Blending ratio of polymers | | | | | | | | | |
| Polymer A (M: 72%) | 25 | — | — | 50 | — | — | 75 | — | — |
| Polymer B (M: 29%) | — | 25 | — | — | 50 | — | — | 75 | — |
| BR1220 | — | — | 25 | — | — | 50 | — | — | 75 |
| Low-cis IR | 75 | 75 | 75 | 50 | 50 | 50 | 25 | 25 | 25 |
| Properties (indexes) | | | | | | | | | |
| 300% Modulus | 103 | 100 | 100 | 106 | 100 | 100 | 111 | 101 | 100 |
| Rebound resilience | 103 | 100 | 100 | 105 | 100 | 100 | 109 | 101 | 100 |
| Abrasion resistance | 104 | 100 | 100 | 111 | 100 | 100 | 120 | 102 | 100 |
| Hardness | 99 | 100 | 100 | 98 | 100 | 100 | 98 | 100 | 100 |
| Fatigue resistance | 107 | 104 | 100 | 113 | 105 | 100 | 122 | 106 | 100 |
| Extrusion length | 103 | 100 | 100 | 110 | 100 | 100 | 119 | 103 | 100 |

TABLE 11

|  | Ex. 23 | Comp. Ex. 43 | Comp. Ex. 44 | Ex. 24 | Comp. Ex. 45 | Comp. Ex. 46 | Ex. 25 | Comp. Ex. 47 | Comp. Ex. 48 |
|---|---|---|---|---|---|---|---|---|---|
| Blending ratio of polymers | | | | | | | | | |
| Polymer A (M: 72%) | 25 | — | — | 50 | — | — | 75 | — | — |
| Polymer B (M: 29%) | — | 25 | — | — | 50 | — | — | 75 | — |
| BR1220 | — | — | 25 | — | — | 50 | — | — | 75 |
| S-SBR-1 | 75 | 75 | 75 | 50 | 50 | 50 | 25 | 25 | 25 |
| Properties (indexes) | | | | | | | | | |
| 300% Modulus | 102 | 100 | 100 | 105 | 100 | 100 | 109 | 100 | 100 |
| Rebound resilience | 103 | 100 | 100 | 106 | 100 | 100 | 112 | 101 | 100 |
| Abrasion resistance | 102 | 100 | 100 | 111 | 101 | 100 | 123 | 101 | 100 |
| Hardness | 99 | 100 | 100 | 98 | 100 | 100 | 98 | 99 | 100 |
| Fatigue resistance | 108 | 103 | 100 | 112 | 104 | 100 | 120 | 105 | 100 |
| Extrusion length | 104 | 100 | 100 | 105 | 101 | 100 | 117 | 104 | 100 |

TABLE 12

|  | Ex. 26 | Comp. Ex. 49 | Comp. Ex. 50 | Ex. 27 | Comp. Ex. 51 | Comp. Ex. 52 | Ex. 28 | Comp. Ex. 53 | Comp. Ex. 54 |
|---|---|---|---|---|---|---|---|---|---|
| Blending ratio of polymers | | | | | | | | | |
| Polymer B (M: 72%) | 25 | — | — | 50 | — | — | 75 | — | — |
| Polymer B (M: 29%) | — | 25 | — | — | 50 | — | — | 75 | — |
| BR1220 | — | — | 25 | — | — | 50 | — | — | 75 |
| S-SBR-2 | 75 | 75 | 75 | 50 | 50 | 50 | 25 | 25 | 25 |
| Properties (indexes) | | | | | | | | | |
| 300% Modulus | 102 | 100 | 100 | 105 | 100 | 100 | 110 | 101 | 100 |
| Rebound resilience | 102 | 100 | 100 | 104 | 100 | 100 | 107 | 100 | 100 |
| Abrasion resistance | 103 | 100 | 100 | 111 | 100 | 100 | 121 | 101 | 100 |
| Hardness | 99 | 100 | 100 | 98 | 100 | 100 | 98 | 100 | 100 |
| Fatigue resistance | 107 | 102 | 100 | 112 | 103 | 100 | 120 | 104 | 100 |
| Extrusion length | 103 | 100 | 100 | 107 | 101 | 100 | 113 | 102 | 100 |

TABLE 13

|  | Ex. 29 | Comp. Ex. 55 | Comp. Ex. 56 | Ex. 30 | Comp. Ex. 57 | Comp. Ex. 58 | Ex. 31 | Comp. Ex. 59 | Comp. Ex. 60 |
|---|---|---|---|---|---|---|---|---|---|
| Blending ratio of polymers | | | | | | | | | |
| Polymer A (M: 72%) | 25 | — | — | 50 | — | — | 75 | — | — |
| Polymer B (M: 29%) | — | 25 | — | — | 50 | — | — | 75 | — |
| BR1220 | — | — | 25 | — | — | 50 | — | — | 75 |
| S-SBR-3 | 75 | 75 | 75 | 50 | 50 | 50 | 25 | 25 | 25 |
| Properties (indexes) | | | | | | | | | |
| 300% Modulus | 102 | 100 | 100 | 105 | 100 | 100 | 111 | 101 | 100 |
| Rebound resilience | 101 | 100 | 100 | 104 | 100 | 100 | 109 | 100 | 100 |
| Abrasion resistance | 103 | 100 | 100 | 110 | 100 | 100 | 122 | 100 | 100 |
| Hardness | 99 | 100 | 100 | 98 | 100 | 100 | 98 | 100 | 100 |
| Fatigue resistance | 108 | 100 | 100 | 112 | 102 | 100 | 120 | 105 | 100 |
| Extrusion length | 105 | 100 | 100 | 110 | 101 | 100 | 119 | 104 | 100 |

TABLE 14

|  | Ex. 32 | Comp. Ex. 61 | Comp. Ex. 62 | Ex. 33 | Comp. Ex. 63 | Comp. Ex. 64 | Ex. 34 | Comp. Ex. 65 | Comp. Ex. 66 |
|---|---|---|---|---|---|---|---|---|---|
| Blending ratio of polymers |  |  |  |  |  |  |  |  |  |
| Polymer A (M: 72%) | 25 | — | — | 50 | — | — | 75 | — | — |
| Polymer B (M: 29%) | — | 25 | — | — | 50 | — | — | 75 | — |
| BR1220 | — | — | 25 | — | — | 50 | — | — | 75 |
| NBR | 75 | 75 | 75 | 50 | 50 | 50 | 25 | 25 | 25 |
| Properties (indexes) |  |  |  |  |  |  |  |  |  |
| 300% Modulus | 103 | 100 | 100 | 107 | 100 | 100 | 112 | 101 | 100 |
| Rebound resilience | 102 | 100 | 100 | 104 | 100 | 100 | 106 | 101 | 100 |
| Abrasion resistance | 106 | 100 | 100 | 113 | 100 | 100 | 127 | 100 | 100 |
| Hardness | 99 | 100 | 100 | 98 | 100 | 100 | 98 | 100 | 100 |
| Fatigue resistance | 110 | 102 | 100 | 117 | 103 | 100 | 130 | 106 | 100 |
| Extrusion length | 105 | 100 | 100 | 111 | 101 | 100 | 120 | 103 | 100 |

TABLE 15

|  | Ex. 35 | Comp. Ex. 67 | Comp. Ex. 68 | Ex. 36 | Comp. Ex. 69 | Comp. Ex. 70 | Ex. 37 | Comp. Ex. 71 | Comp. Ex. 72 |
|---|---|---|---|---|---|---|---|---|---|
| Blending ratio of polymers |  |  |  |  |  |  |  |  |  |
| Polymer A (M: 72%) | 25 | — | — | 50 | — | — | 75 | — | — |
| Polymer B (M: 29%) | — | 25 | — | — | 50 | — | — | 75 | — |
| BR1220 | — | — | 25 | — | — | 50 | — | — | 75 |
| H-NBR | 75 | 75 | 75 | 50 | 50 | 50 | 25 | 25 | 25 |
| Properties (indexes) |  |  |  |  |  |  |  |  |  |
| 300% Modulus | 102 | 100 | 100 | 106 | 100 | 100 | 111 | 101 | 100 |
| Rebound resilience | 102 | 100 | 100 | 103 | 100 | 100 | 105 | 100 | 100 |
| Abrasion resistance | 104 | 100 | 100 | 111 | 101 | 100 | 123 | 101 | 100 |
| Hardness | 100 | 100 | 100 | 99 | 100 | 100 | 99 | 100 | 100 |
| Fatigue resistance | 107 | 100 | 100 | 112 | 102 | 100 | 120 | 104 | 100 |
| Extrusion length | 105 | 100 | 100 | 107 | 100 | 100 | 110 | 103 | 100 |

TABLE 16

|  | Ex. 38 | Comp. Ex. 73 | Comp. Ex. 74 | Ex. 39 | Comp. Ex. 75 | Comp. Ex. 76 | Ex. 40 | Comp. Ex. 77 | Comp. Ex. 78 |
|---|---|---|---|---|---|---|---|---|---|
| Blending ratio of polymers |  |  |  |  |  |  |  |  |  |
| Polymer A (M: 72%) | 25 | — | — | 50 | — | — | 75 | — | — |
| Polymer B (M: 29%) | — | 25 | — | — | 50 | — | — | 75 | — |
| BR1220 | — | — | 25 | — | — | 50 | — | — | 75 |
| EPDM | 75 | 75 | 75 | 50 | 50 | 50 | 25 | 25 | 25 |
| Properties (indexes) |  |  |  |  |  |  |  |  |  |
| 300% Modulus | 103 | 100 | 100 | 104 | 100 | 100 | 100 | 101 | 100 |
| Rebound resilience | 101 | 100 | 100 | 103 | 100 | 100 | 106 | 100 | 100 |
| Abrasion resistance | 103 | 100 | 100 | 107 | 100 | 100 | 115 | 100 | 100 |
| Hardness | 100 | 100 | 100 | 99 | 100 | 100 | 100 | 100 | 100 |
| Fatigue resistance | 109 | 100 | 100 | 113 | 102 | 100 | 120 | 104 | 100 |
| Extrusion length | 107 | 100 | 100 | 100 | 100 | 100 | 115 | 103 | 100 |

TABLE 17

|  | Ex. 41 | Comp. Ex. 79 | Comp. Ex. 80 | Ex. 42 | Comp. Ex. 81 | Comp. Ex. 82 |
|---|---|---|---|---|---|---|
| Blending ratio of polymers |  |  |  |  |  |  |
| Polymer A (M: 72%) | 30 | — | — | 30 | — | — |
| Polymer B (M: 29%) | — | 30 | — | — | 30 | — |
| BR1220 | — | — | 30 | — | — | 30 |
| NR | 40 | 40 | 40 | 40 | 40 | 40 |
| E-SBR-1 | 30 | 30 | 30 | — | — | — |
| S-SBR-1 | — | — | — | 30 | 30 | 30 |
| Properties (indexes) |  |  |  |  |  |  |
| 300% Modulus | 104 | 100 | 100 | 105 | 100 | 100 |
| Rebound resilience | 102 | 100 | 100 | 103 | 100 | 100 |
| Abrasion resistance | 106 | 101 | 100 | 107 | 101 | 100 |
| Hardness | 98 | 100 | 100 | 99 | 100 | 100 |
| Fatigue resistance | 112 | 105 | 100 | 119 | 104 | 100 |
| Extrusion length | 107 | 100 | 100 | 110 | 100 | 100 |

INDUSTRIAL APPLICABILITY

By the present invention, there is provided a highly terminal-modified rubber can be provided, which has not heretofore been obtained with a lanthanoid rare earth element-containing catalyst. The highly terminal-modified rubber and a composition comprising the rubber exhibit good abrasion resistance, fatigue resistance, tensile properties, rebound resilience, processability and low-temperature characteristics, and, therefore, can be used in various fields wherein such advantageous properties are utilized, for example, tread, carcass, side-wall and bead portions of tires; rubber articles such as a hose, a window frame, a belt, a vibration damper and automobile parts; and resin-reinforced rubbers such as high-impact polystyrene and ABS resin.

We claim:

1. A modified conjugated diene polymer obtained by modifying active terminals of a living conjugated diene polymer prepared by a polymerization using a lanthanoid rare earth element-containing compound as a catalyst in an organic solvent, with at least one modifying compound selected from the group consisting of N-substituted aminoketones, N-substituted aminothioketones, N-substituted aminoaldehydes, N-substituted aminothioaldehyde and compounds having a C(=M)—N< bond in the molecules wherein M is an oxygen atom or a sulfur atom; said modified conjugated diene polymer exhibiting a molecular weight distribution such that the molecular weight distribution curve is monomodal and the ratio of weight average molecular weight (Mw)/number average molecular weight (Mn) is in the range of 1.3 to 5; the weight average molecular weight (Mw) being in the range of 100,000 to 1,000,000, the content of cis-1,4-bonds being at least 70%, and the degree of terminal modification being at least 50%.

2. A modified conjugated diene polymer according to claim 1 wherein the lanthanoid rare earth element-containing compound is a salt of a lanthanoid rare earth element.

3. A modified conjugated diene polymer according to claim 2 wherein the lanthanoid rare earth element salt is an organic acid salt.

4. A modified conjugated diene polymer according to claim 3 wherein the organic acid salt is a salt of a carboxylic acid.

5. A modified conjugated diene polymer according to claim 4 wherein the carboxylic acid has at least 5 carbon atoms.

6. A modified conjugated diene polymer according to claim 1 wherein the modifying compound is at least one compound selected from the group consisting of N-substituted aminoketones and N-substituted lactams.

7. A modified conjugated diene polymer according to claim 1 wherein the conjugated diene polymer is polybutadiene.

8. A rubber composition comprising at least 20% by weight of the modified conjugated diene polymer as claimed in claim 1.

9. A rubber composition according to claim 8 which comprises at least 20% by weight of the modified conjugated diene polymer and not more than 80% by weight of at least one rubber selected from the group consisting of natural rubber, a synthetic isoprene rubber, a styrene-butadiene copolymer rubber, a cis-1,4-polybutadiene rubber, an ethylene-propylene-diene copolymer rubber, an acrylonitrilebutadiene copolymer rubber, a chloroprene rubber and a halogenated butyl rubber.

* * * * *